P. L. CRITTENDEN.
PROTECTIVE DEVICE FOR MOTOR COMPRESSORS.
APPLICATION FILED APR. 21, 1915.
1,275,536.
Patented Aug. 13, 1918.
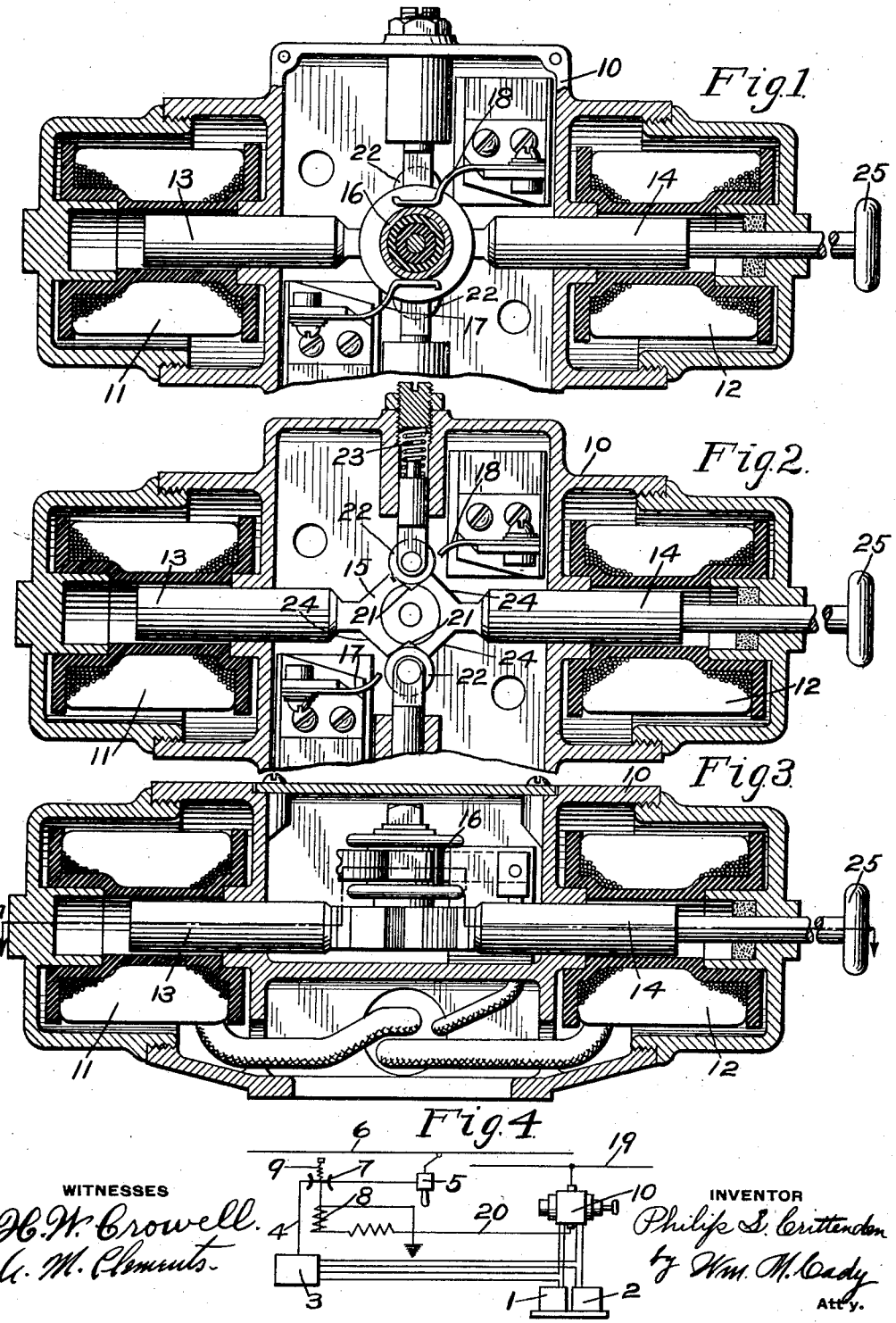

UNITED STATES PATENT OFFICE.

PHILIP L. CRITTENDEN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PROTECTIVE DEVICE FOR MOTOR-COMPRESSORS.

1,275,536.             Specification of Letters Patent.      Patented Aug. 13, 1918.

Application filed April 21, 1915. Serial No. 22,797.

*To all whom it may concern:*

Be it known that I, PHILIP L. CRITTENDEN, a citizen of the United States, residing at Edgewood, in the county of Allegheny and State of Pennsylvania, have invented new and useful Improvements in Protective Devices for Motor-Compressors, of which the following is a specification.

This invention relates to controlling devices for electric motors, and more particularly to a system in which two motors are coupled together.

An equipment of this character has been proposed in connection with motor driven air compressors as employed on cars, where the current is at one voltage on one portion of the road and at another voltage on another portion, for example, 600 and 1200 volts. When running on 600 volts, the motors are connected in parallel, and on 1200 volts they are connected in series.

The principal object of my invention is to provide means for automatically cutting out the motors, in case either one of the motors becomes disabled, or if a ground occurs between the two motors, or the like.

In the accompanying drawing, Figure 1 is a section, substantially on the line *a—a* of Fig. 3, of the motor protecting device; Fig. 2 a central section thereof, showing the yielding stop mechanism; Fig. 3 a section of the motor protecting device taken on a plane at right angles to the plane of the section shown in Fig. 2; and Fig. 4 a diagrammatic view of a double motor equipment, showing the application of the protecting device.

As an example of the application of the motor protecting device, I have shown diagrammatically on Fig. 4 a car equipment comprising compressor motors 1 and 2, a change-over switch device 3 for connecting the motors to run either in parallel or in series, and a supply wire 4 having the usual cut-out switch 5 for controlling the supply of current from a current supply main 6.

According to my invention, an additional switch 7 is provided in the supply wire 4, said switch being normally held closed by the energization of a solenoid 8 and adapted to be opened by a spring 9 when the solenoid is deënergized.

The circuit of the solenoid 8 is controlled by a device 10 comprising solenoids 11 and 12, the coil of solenoid 11 being in series with the compressor motor 1 and the coil of solenoid 12 with compressor motor 2.

The solenoids 11 and 12 are mounted in a casing in an opposed relation and the respective cores 13 and 14 are connected to an intermediate member 15 carrying at one side a contact sleeve 16 adapted in its central position to connect stationary contacts 17 and 18, so as to close a circuit for connecting a current supply wire 19 with the circuit wire 20 of the solenoid 8.

In operation, when the motors are running normally, there is substantially the same current flow through both of the solenoids 11 and 12 and since the solenoids act in opposition, the pull of the coil is balanced and the parts will be maintained in the neutral position shown closing the circuit of the solenoid 8 and thereby maintaining the main supply circuit closed through the switch 7. If either one of the motors becomes disabled, however, or should a ground occur between the motors, then an excessive current will flow through one of the motors and through a corresponding solenoid coil of the protecting device and the core of this solenoid will be drawn in so as to shift the contact sleeve 16 out of engagement with the fixed contacts 17 and 18.

The circuit of the solenoid 8 is thus opened and the solenoid being deënergized, the spring 9 operates to open the switch 7 and thereby break the circuit through which current is supplied to the motors.

In order to prevent action of the protecting device under slight differences in current passing through the opposing solenoids 11 and 12, a yielding resistance to the movement of the solenoid cores may be applied and for this purpose, opposite notches 21 may be provided in the member 15, within which rollers 22 normally rest, said rollers being pressed inwardly by coil springs 23.

It will now be seen that a marked difference in the pull of one solenoid as compared with the other must occur in order to cause the rollers 22 to retract out of the way. By providing inclines 24 on the opposite sides of the notches 21, when the rollers 22 have been retracted out of the notches they will engage the inclines, and then assist instead of oppose the movement. A quick break of the contacts is thus effected so as to prevent arcing.

The device may be manually reset to normal position by means of a handle 25 attached to one of the solenoid cores.

Having now described my invention, what I claim as new and desire to secure by Letters Patent, is:—

A switch device comprising opposed solenoid magnets, a switch for closing a circuit upon energization of both magnets, and means adapted upon deënergization of either magnet to first yieldingly resist and then assist the movement of said switch to open said circuit.

In testimony whereof I have hereunto set my hand.

PHILIP L. CRITTENDEN.

Witnesses:
A. M. CLEMENTS,
S. W. KEEFER.

Copies of this patent may be obtained for five cents each, by addressing the "Commissioner of Patents, Washington, D. C."